(12) United States Patent
Fulda

(10) Patent No.: US 9,618,646 B2
(45) Date of Patent: Apr. 11, 2017

(54) ACOUSTIC SYNCHRONIZATION SYSTEM, ASSEMBLY, AND METHOD

(75) Inventor: Christian Fulda, Lower Saxony (DE)

(73) Assignee: BAKERY HUGHES INCORPORATED, Houston, TX (US)

( * ) Notice: Subject to any disclaimer, the term of this patent is extended or adjusted under 35 U.S.C. 154(b) by 1406 days.

(21) Appl. No.: 13/401,271

(22) Filed: Feb. 21, 2012

(65) Prior Publication Data
US 2013/0213714 A1 Aug. 22, 2013

(51) Int. Cl.
*G01V 3/30* (2006.01)

(52) U.S. Cl.
CPC ............ *G01V 3/30* (2013.01); *G01V 2200/12* (2013.01)

(58) Field of Classification Search
CPC ....... E21B 49/00; G01V 3/30; G01V 2200/12
See application file for complete search history.

(56) References Cited

U.S. PATENT DOCUMENTS

| | | | | |
|---|---|---|---|---|
| 2,416,337 A | * | 2/1947 | Mason | 318/116 |
| 2,427,348 A | * | 9/1947 | Bond et al. | 367/157 |
| 2,708,485 A | * | 5/1955 | Vogel | G01V 1/44 346/107.1 |
| 2,952,834 A | * | 9/1960 | Noonan et al. | 367/24 |
| 2,973,505 A | * | 2/1961 | Johannesen | G01V 3/34 324/99 R |
| 3,081,838 A | * | 3/1963 | Platt | G01V 1/46 367/27 |
| 3,231,041 A | * | 1/1966 | Kokesh | 367/25 |
| 3,237,150 A | * | 2/1966 | Beck et al. | 367/107 |
| 3,434,105 A | * | 3/1969 | Schwartz | 340/856.4 |
| 3,465,337 A | * | 9/1969 | Kurimura et al. | 342/146 |
| 3,517,767 A | * | 6/1970 | Straus et al. | 367/104 |
| 3,946,357 A | * | 3/1976 | Weinstein et al. | 367/77 |
| 4,293,934 A | * | 10/1981 | Herolz | G01V 1/46 346/33 WL |
| 5,502,686 A | * | 3/1996 | Dory et al. | 367/34 |
| 5,899,958 A | | 5/1999 | Dowell et al. | |
| 5,924,499 A | | 7/1999 | Birchak et al. | |

(Continued)

FOREIGN PATENT DOCUMENTS

| EP | 2157278 A1 | 2/2010 |
|---|---|---|
| EP | 2157279 A1 | 2/2012 |

(Continued)

OTHER PUBLICATIONS

International Search Report and Written Opinion Application No. PCT/US2013/026847 dated Jun. 12, 2013; pp. 17.

(Continued)

*Primary Examiner* — Luke Ratcliffe
*Assistant Examiner* — Amienatta M Ndure Jobe
(74) *Attorney, Agent, or Firm* — Cantor Colburn LLP

(57) ABSTRACT

A system for synchronizing instruments in a drill pipe to detect formation characteristics comprises at least one first transmitter for transmitting a first signal, at least one first receiver for receiving a second signal having information based on the first signal, at least one acoustic transmitter for transmitting an acoustic signal, and at least one acoustic sensor electrically connected to one of the at least one first transmitter and the at least one first receiver, the at least one acoustic sensor for sensing the acoustic signal for synchronizing the at least one first transmitter and the at least one first receiver.

17 Claims, 5 Drawing Sheets

(56) References Cited

U.S. PATENT DOCUMENTS

| | | | |
|---|---|---|---|
| 6,738,314 B1* | 5/2004 | Teeter et al. | 367/131 |
| 7,710,829 B2* | 5/2010 | Wei et al. | 367/128 |
| 7,755,361 B2 | 7/2010 | Seydoux et al. | |
| 7,825,664 B2 | 11/2010 | Homan et al. | |
| 2005/0007259 A1* | 1/2005 | Minto | G01V 1/40 340/854.3 |
| 2005/0161258 A1 | 7/2005 | Lockerd, et al. | |
| 2006/0122778 A1 | 6/2006 | Gao et al. | |
| 2008/0084789 A1* | 4/2008 | Altman | 367/127 |
| 2009/0039889 A1* | 2/2009 | Wilt | G01V 3/30 324/338 |
| 2009/0231958 A1* | 9/2009 | Wei et al. | 367/118 |
| 2010/0100330 A1* | 4/2010 | Burkholder et al. | 702/14 |
| 2011/0205080 A1* | 8/2011 | Millot | E21B 47/16 340/854.4 |
| 2012/0068712 A1* | 3/2012 | Taherian et al. | 324/338 |
| 2012/0250461 A1* | 10/2012 | Millot | H04B 11/00 367/82 |
| 2012/0262179 A1* | 10/2012 | Whan et al. | 324/345 |

FOREIGN PATENT DOCUMENTS

| | | |
|---|---|---|
| WO | 2010006302 A2 | 1/2010 |
| WO | 2010069623 A1 | 6/2010 |

OTHER PUBLICATIONS

Bittar, M., et al.; "A New Azimuthal Deep-Reading Resisitivity Tool for Geosteering and Advanced Formation Evaluation"; Society of Petroleum Engineers; SPE 109971; p. 1-9; 2007.

Davies, D.H., et al.; "Azimuthal Resistivity Imgaging: A New-Generation Laterolog"; SPE Formation Evaluation; p. 165-174; Sep. 1994.

* cited by examiner

ACOUSTIC SYNCHRONIZATION SYSTEM, ASSEMBLY, AND METHOD

BACKGROUND

Tools that measure azimuthal resistivity of a formation transmit a low frequency electromagnetic (EM) signal from a transmitter antenna and receive the EM signal with one or several receiver antenna distanced apart from the transmitter antenna. Electromagnetic formation properties can be determined based on the attenuation or phase difference between transmitted and received signals, or between signals received at receiver antennae spaced at different distances from the transmitter antennae. Tools that measure deep azimuthal resistivity require the transmitter antenna and receiver antenna to be spaced a longer distance apart than tools that measure shallow azimuthal resistivity. As used herein, the term "shallow azimuthal resistivity" shall refer to measurements within approximately 1 meter of the tool and the term "deep azimuthal resistivity" shall refer to measurements of resistivity greater than 1 meter from the tool. In particular, the term "deep azimuthal resistivity" refers to a depth such that a transmitter and receiver must be spaced apart from each other in different sections or tools of a drill pipe to obtain a measurement.

SUMMARY

Disclosed herein is a system for synchronizing instruments in a drill pipe to detect formation characteristics comprising at least one first transmitter in the drill pipe for transmitting a first signal; at least one first receiver in the drill pipe for receiving a second signal having information based on the first signal; at least one acoustic transmitter in the drill pipe for transmitting an acoustic signal; and at least one acoustic sensor in the drill pipe and electrically connected to one of the at least one first transmitter and the at least one first receiver, the at least one acoustic sensor for sensing the acoustic signal for synchronizing the at least one first transmitter and the at least one first receiver.

Also disclosed herein is a method for synchronizing instruments in a drill pipe for detecting formation characteristics, comprising transmitting an acoustic signal from an acoustic transmitter in a drill pipe; receiving the acoustic signal at an acoustic sensor in the drill pipe; and synchronizing a first transmitter and a first plurality of receivers based on the acoustic signal.

Also disclosed herein is drill pipe assembly, comprising a first receiver configured to receive a signal from a formation surrounding the drill pipe, the signal including formation information; and a first acoustic sensor configured to sense an acoustic signal and to adjust a characteristic of the first receiver based on the received acoustic signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system and method are presented herein by way of exemplification and not limitation with reference to the Figures.

Figure 1:
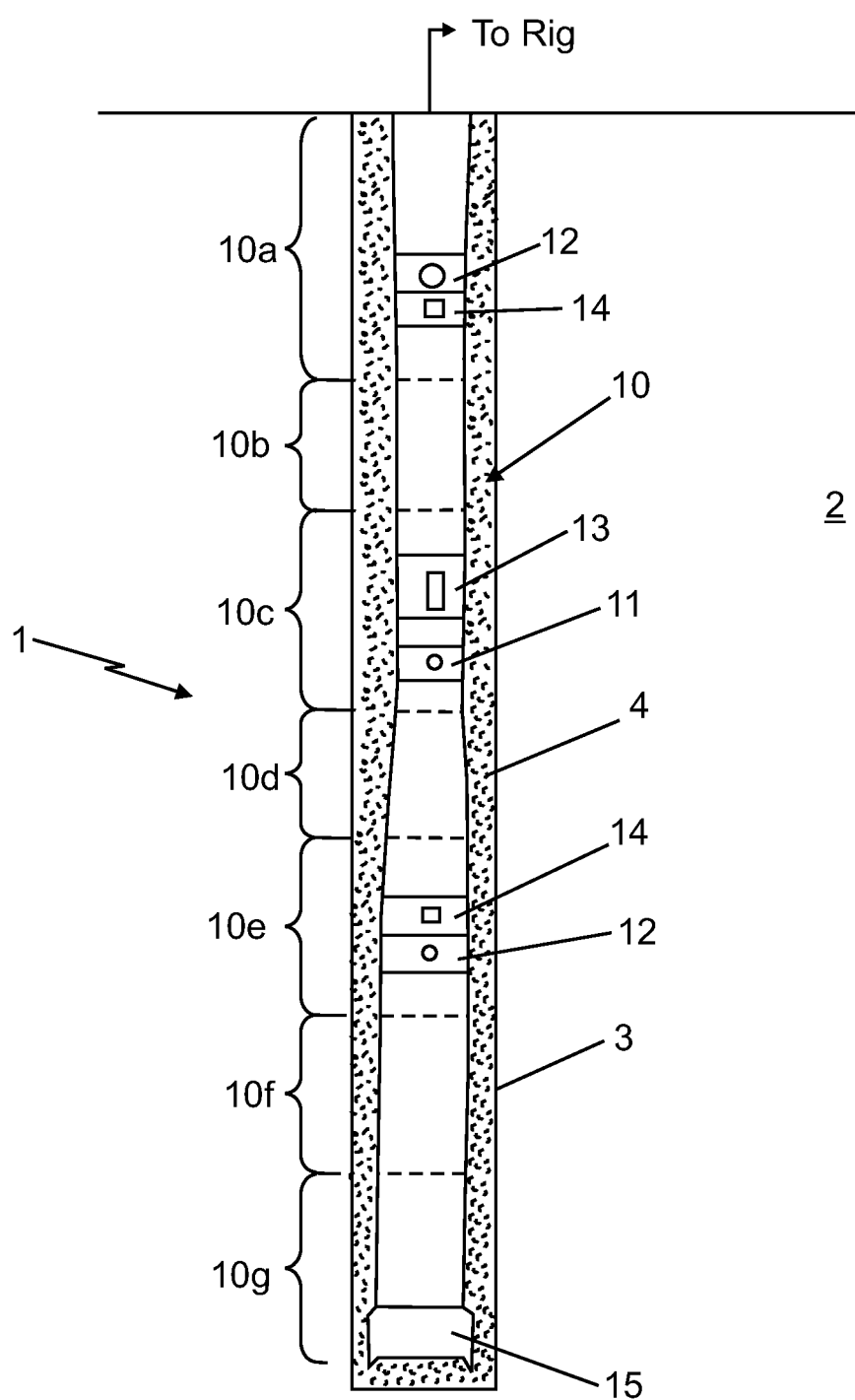
FIG. 1 illustrates a borehole assembly according to one embodiment of the present invention.

Referring to FIG. 1, an exemplary embodiment of a borehole assembly 1 includes a drill pipe 10 connected to a rig at one end and having a drill bit 15 at the other end. The drill pipe 10 is made up of a plurality of subsections (subs) 10a-10g, which are mechanically separate structures that are connected end-to-end to form the length of the drill pipe 10. The illustrated drill pipe 10 includes at least one radiation transmitter 11 and at least one radiation receiver 12. For example, FIG. 1 illustrates one electromagnetic (EM) transmitter 11 (on sub 10c) and two EM receivers 12 (on subs 10a and 10e). However, any number of EM transmitters 11 and receivers 12 may be utilized and their locations can be varied. In addition, in some embodiments, the EM transmitter 11 may be configured to operate as a receiver, and one or more of the EM receivers 12 may be configured to operate as a transmitter. The EM receivers 12 are spaced apart from the EM transmitters 11 at predetermined distances. For example, to measure deep azimuthal resistivity, the EM transmitters 11 and receivers 12 must be spaced farther apart from the transmitters and from each other than when measuring shallow azimuthal resistivity. Consequently, the EM transmitter 11 and EM receivers 12 are located in separate subs, 10a, 10c, and 10e, respectively.

In the embodiment illustrated in FIG. 1, one EM transmitter 11 is located between two EM receivers 12 and is spaced apart from each of the EM receivers 12. In such an embodiment, the EM transmitter 11 may be equidistant from the EM receivers 12. In an alternative embodiment, the EM transmitter 11 is closer to one of the EM receivers 12 than to the other.

In yet another embodiment, the EM transmitter 11 may be located to one side of each of the EM receivers 12. For example, the EM transmitter 11 may be located in sub 10b, one EM receiver 12 may be located in sub 10d, and another EM receiver 12 may be located in sub 10f. In another embodiment, the EM transmitter 11 may be located downhole from each of the EM receivers 12. The EM transmitter 11 transmits an EM signal into the formation 2, and the EM receivers 12 receive corresponding EM signals based on the EM signal from the EM transmitter 11 and further including data about the characteristics of the formation 2, such as composition, porosity, resistivity, etc. While EM transmitters 11 and receivers 12 are described in the embodiment illustrated in FIG. 1, it is understood that any type of transmitters and receivers may be used to obtain formation data.

Due to differences in characteristics at different locations within the borehole 3, the timing, phase, and/or frequency of the EM receivers 12 may drift from each other and from the EM transmitter 11 when clock signals or other driving signals are out of sync. The non-synchronization of the EM receivers 12 and transmitter 11 may result in flawed formation data. In addition, due to distances or other design considerations, it may be difficult or undesirable to run a wire between the EM receivers 12, the EM transmitters 11, or between the EM transmitters 11 and the EM receivers 12. For example, the connectors that connect one sub 10 to another typically include a connection for power and data communication, such as transmission of formation data to a surface-based computer system, and no connection to provide synchronization between transmitters 11 and receivers 12 of different subs 16. In other words, no wire or conductor is provided in the borehole assembly 10 to synchronize the EM transmitter 11 and EM receivers 12.

To synchronize the EM transmitter 11 and EM receivers 12, the drill pipe 10 further includes at least one acoustic transmitter 13 and at least one acoustic sensor 14. For example, FIG. 1 illustrates one acoustic transmitter 13 and two acoustic sensors 14. However, any number of acoustic transmitters 13 and sensors 14 may be utilized. For example, in one embodiment, one acoustic transmitter 13 is located next to an EM transmitter 11 and one acoustic sensor 14 is located next to one EM receiver 12. In another embodiment, an acoustic sensor 14 is located next to the EM transmitter 11 and EM receivers 12, and the acoustic transmitter 13 is separated from the EM transmitter 11 and EM receivers 12.

In embodiments of the present invention, the acoustic transmitter 13 and the acoustic sensors 14 synchronize the EM transmitter 11 and EM receivers 12. In particular, the acoustic transmitter 13 transmits an acoustic signal via one or more of the drilling mud 4, formation 2, or drill pipe 10. The acoustic signal is received by the acoustic sensors 14, which then synchronize the EM transmitter 11 and EM receivers 12 based on the acoustic signal.

Figure 2:
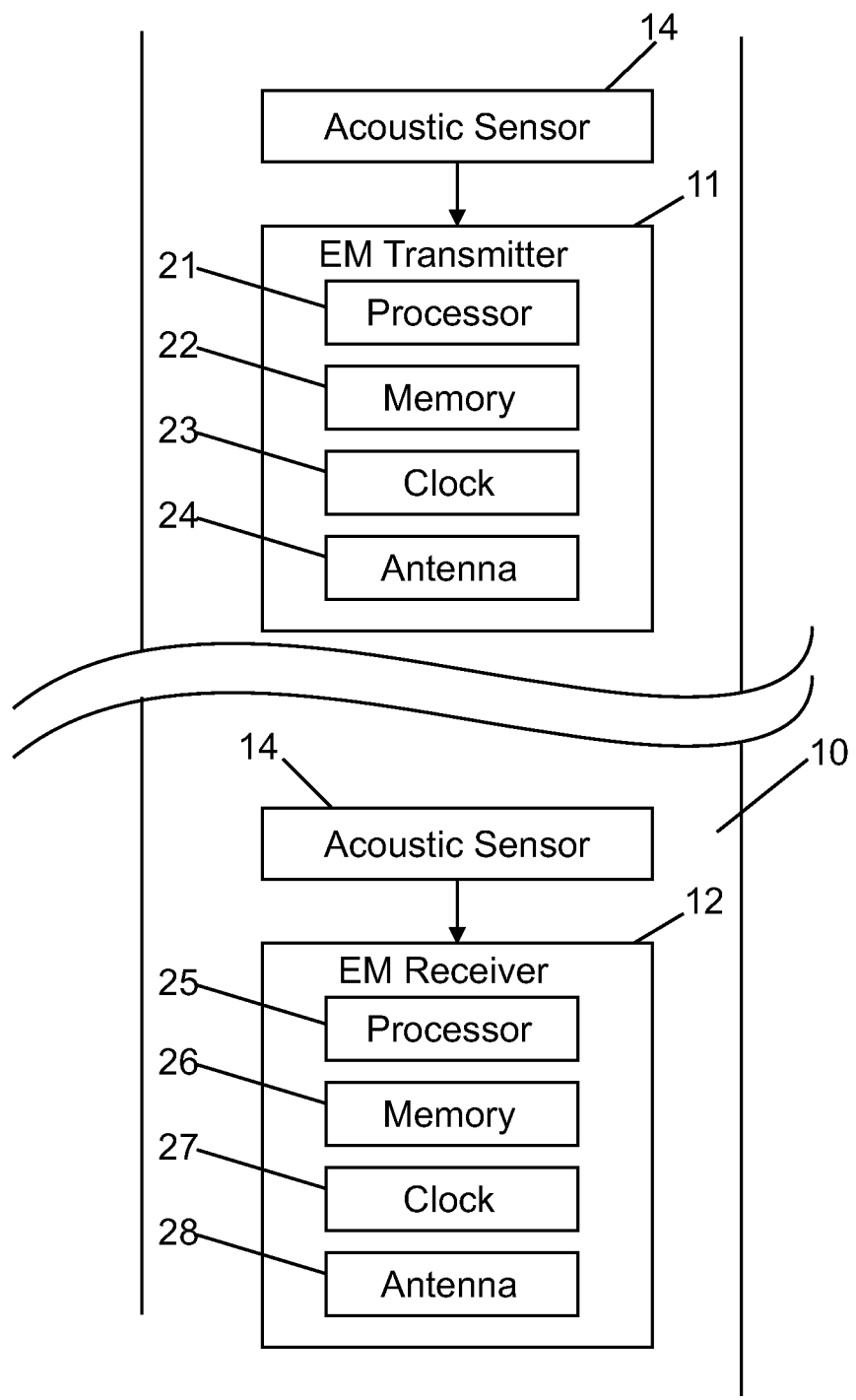
FIG. 2 illustrates components of a synchronization system according to an embodiment of the invention.

FIG. 2 illustrates the synchronization system according to one embodiment. An EM transmitter 11 includes an antenna 24 to transmit an EM signal, and a processor 21, memory 22, and clock 23. The clock 23 may be, for example, an oscillator, or other clock-generating device. In one embodiment, the clock 23 determines the timing of the operations of the processor 21, memory 22 and antenna 24, such as a frequency and duration of signals transmitted from the antenna 24. An acoustic sensor 14 is electrically connected to the EM transmitter 11. The acoustic sensor 14 receives an acoustic signal from the acoustic transmitter 13 and synchronizes the EM transmitter 11 to the EM receiver 12 based on the received acoustic signal.

In one embodiment, the acoustic sensor 14 transmits a synchronization signal that controls the processor 21 to transmit a signal via the antenna at a particular time or of a particular duration without controlling the operation of the clock 23. For example, in one embodiment, the processor 21 receives the synchronization signal from the acoustic sensor 14, accesses memory 22 to decode the data in the synchronization signal by taking into account factors such as a known and predetermined distance from the acoustic sensor 14 to the acoustic transmitter 13, materials between the acoustic sensor 14 and acoustic transmitter 13, such as materials of the drill pipe 10, the drilling mud 4, or the formation 2, a known and predetermined transmission frequency or duration, or any other applicable factors. The processor 21 may then control the antenna 24 to transmit an EM signal at a time and/or duration indicated by the synchronization signal. In another embodiment, the synchronization signal may be transmitted at all times (e.g., continuous transmission). For instance, the signal could be transmitted each time the transmitter signal switched from a positive to a negative half-period and vice versa.

In the embodiment illustrated in FIG. 2, another acoustic sensor 14 is connected to the EM receiver 12 to synchronize the EM receiver 12 with the EM transmitter 11. The EM receiver 12 includes a processor 25, memory 26, clock 27, and antenna 28. The antenna 28 receives an EM signal 28 that corresponds to the EM signal generated by the EM transmitter 11, but also includes information about the formation 2, such as resistivity, porosity, and composition of the formation 2. For example, in some embodiments, the EM signal generated by the EM transmitter 11 interacts with the formation 2 leading to an attenuation and/or phase shift that is detected by the EM receiver 12.

The acoustic sensor 14 receives an acoustic signal 14 generated by the acoustic transmitter 13 and generates a synchronization signal. For example, in one embodiment, the processor 25 receives the synchronization signal from the acoustic sensor 14 and accesses memory 26 to decode the data in the synchronization signal by taking into account factors such as a known and predetermined distance from the acoustic sensor 14 to the acoustic transmitter 13, materials between the acoustic sensor 14 and acoustic transmitter 13, such as materials of the drill pipe 10, the drilling mud 4, or the formation 2, a known and predetermined transmission frequency or duration, or any other applicable factors. The processor 25 may then control the antenna 28 to operate at a time and/or duration indicated by the synchronization signal. In addition, the processor 25 may adjust time information of received EM signal data stored in memory 26 based on the synchronization signal.

In yet another embodiment, the EM transmitter 11 and EM receiver 12 are synchronized by synchronizing the clocks 23 and 27. For example, the processor 21 may utilize the synchronization signal received from the acoustic sensor 14 to adjust a frequency or phase of the clock 23. The clock 23, in turn, controls the timing and duration of EM signal transmission operations. Similarly, the processor 25 may utilize the synchronization signal received from the acoustic sensor 14 to adjust a frequency of phase of the clock 27. The clock 27 in turn controls the timing and duration of operation of the antenna 28 and provides time data to be stored in memory 26 with data obtained by the antenna 28.

Referring to FIGS. 1 and 2, by way of explanation of one example, and not limiting embodiments of the invention to any one example, the borehole assembly 10 includes an EM transmitter including a transmission antenna 24 that is a Z-antenna, or an antenna that corresponds to a magnetic dipole with the dipole axis along the axis of the sub 10c. In addition, the EM receivers 12 include receiver antennas 28 that are X antennas, or magnetic dipoles with a dipole moment perpendicular to the tool axis. Formation 2 data is obtained either by attenuation and/or the phase difference between the signals received by the receiving antennas 28, which attenuation and/or phase difference is a result of properties of or discontinuities in the formation 2 within the volume that is sensed with the EM receivers 12. Generally, these discontinuities are resistivity contrasts from a more resistive portion of the formation 2 than where the EM receiver 12, or vice versa. The direction to the resistivity discontinuity can be derived from the direction where the maximum amplitude of the signal dependent on the receiving antenna 28 occurs.

However, with such a type of configuration it may be difficult or impossible to distinguish a high-to-low-contrast on one side from the corresponding low-to-high-contrast on the side 180° apart. Additional information is therefore required to determine whether the signal is created by a high-to-low contrast from one side of the sub 16, such as sub 10e or from a low-to-high contrast with the other side of the sub 16, such as sub 10e, where the other side is 180° from the one side. Synchronization between the EM transmitter 11 and EM receiver 12 provides the needed additional information. As used herein, the term "synchronization" refers to sending a signal that allows for distinguishing between situations when a transmitter signal's positive half-period is followed by either a positive half-period of the receiver signal or a negative half-period of the receiver signal. To be able to distinguish between these situations, the time information when the positive half-period of the signal starts has to be submitted to the EM receiver 12. This can be done by transmitting an acoustic signal from the acoustic transmitter 13 at predefined points during the transmission, such as at the beginning of every $10^{th}$ transmitter signal period.

Based on the received acoustic signal, the resistivity is determined from the phase shift and/or the attenuation between the EM receivers 12. Together with the directional information coming from a device that is capable of determining this directional information (e.g. a magnetometer) the azimuth properties of the calculated resistivities are referenced.

Figure 3:
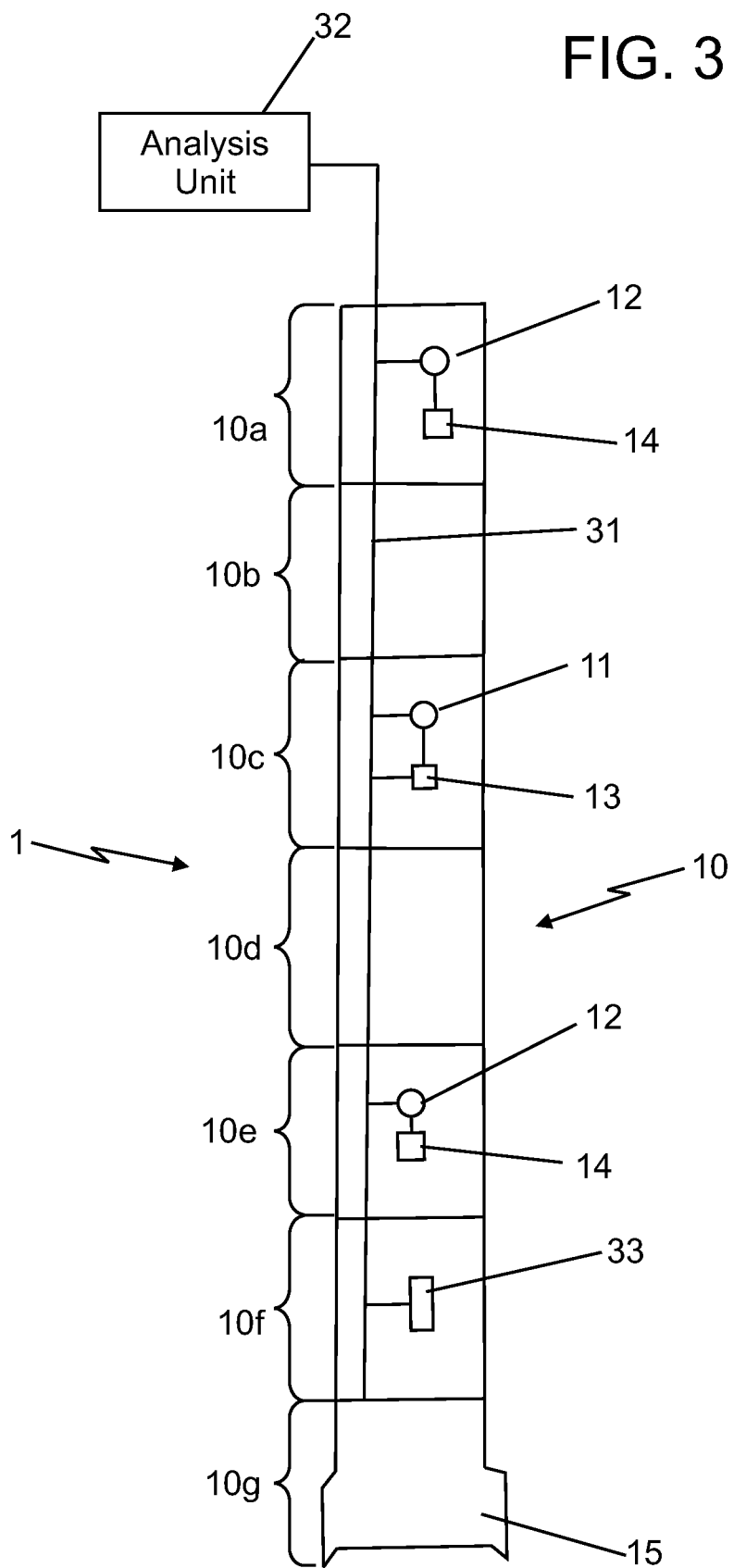
FIG. 3 illustrates a borehole assembly according to one embodiment.

FIG. 3 illustrates a borehole assembly 1 according to an embodiment of the invention. The borehole assembly 1 is similar to the borehole assembly 1 illustrated in FIG. 1. However, FIG. 3 further illustrates a data line 31 extending from an analysis unit 32 to the formation data collection devices in the borehole assembly 1. In one embodiment, each sub 10a-10f includes a data input at one end and a data output at one end, and the data line 31 extends between the data input and the data output to provide data to the analysis unit 32. For example, the EM receivers 12 may transmit data regarding detected EM signals, the EM transmitter 11 may transmit data, such as transmission timing data, and the acoustic transmitter 13 may transmit data regarding an acoustic signal transmission. The borehole assembly 1 may further include a directional detector 33, such as a magnetometer, to detect a directional facing of the drill pipe 10.

The analysis unit 32 may include a computer having at least a processor and memory capable of receiving as an input the formation data and directional data from the instruments of the borehole assembly, and in analyzing the formation data and directional data to determine formation characteristics corresponding to locations in the formation 2 around the borehole 3.

Since the data line 31 is dedicated to providing data to the analysis unit 32, the data line 31 may be unable to provide synchronization to the EM transmitter 11 and the EM receivers 12. Consequently, as discussed above, the acoustical transmitter 13 may transmit an acoustical signal that is received by the acoustical receivers 14. In one embodiment, the data from the acoustical receivers 14 is combined with the data from the EM receivers 12 and transmitted to the analysis unit 32. Using the data from the acoustical receivers 14 and the EM receivers 12, the analysis unit 32 may determine directional characteristics of received EM signals.

Figure 4:
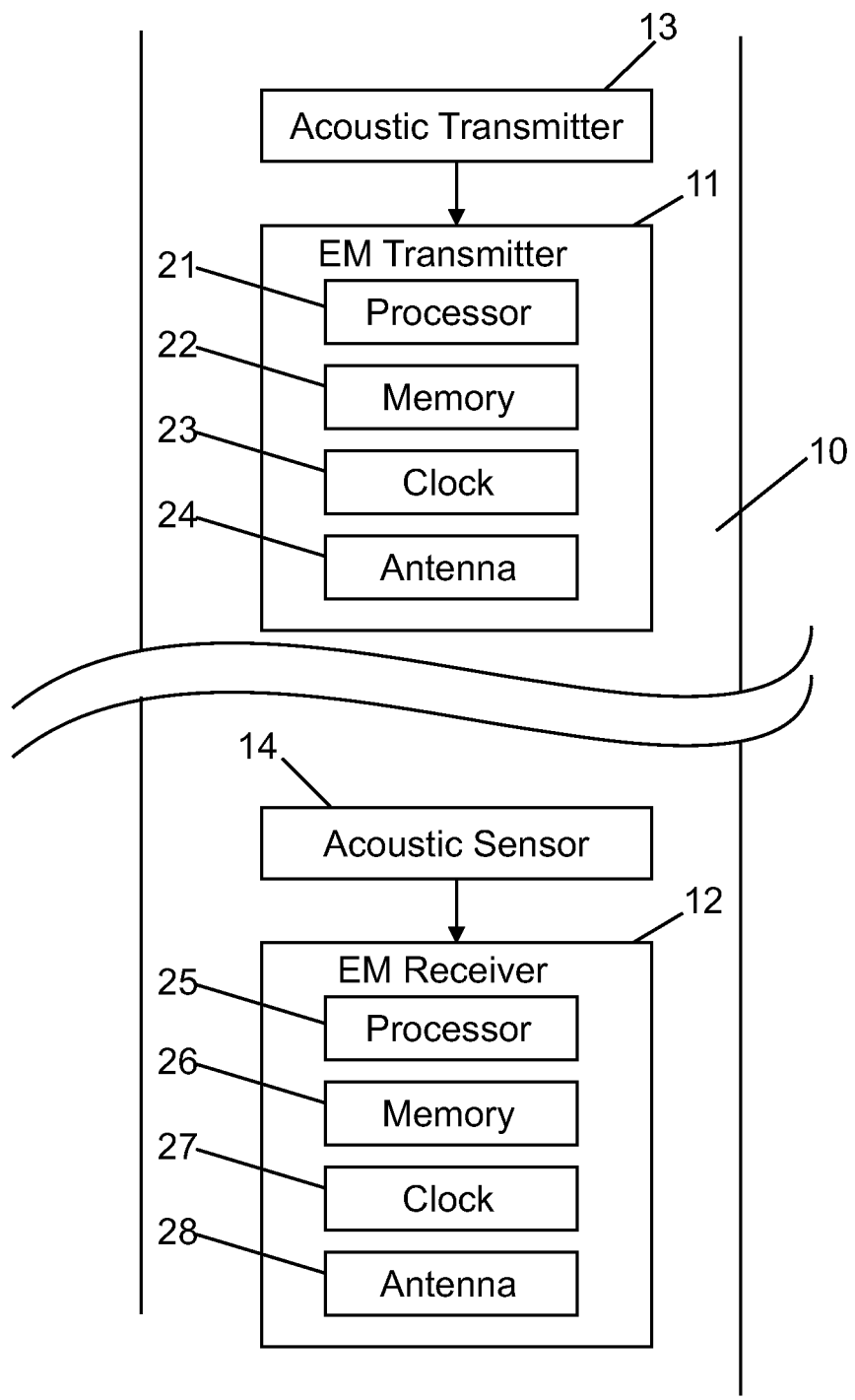
FIG. 4 illustrates components of a synchronization system according to one embodiment.

FIG. 4 illustrates another embodiment of the synchronization system. FIG. 4 is similar to FIG. 2, except in FIG. 4, the acoustic transmitter 13 is electrically connected to the EM transmitter 11. When the acoustic transmitter 13 transmits an acoustic signal to synchronize the EM transmitter 11 and EM receiver 12, the acoustic transmitter 13 may transmit a synchronization signal to the EM transmitter 11. The synchronization signal from the acoustic transmitter 13 may then be used to control the processor 21 and antenna 24, or to control an operation of the clock 23, as discussed above with respect to FIG. 2.

Figure 5:
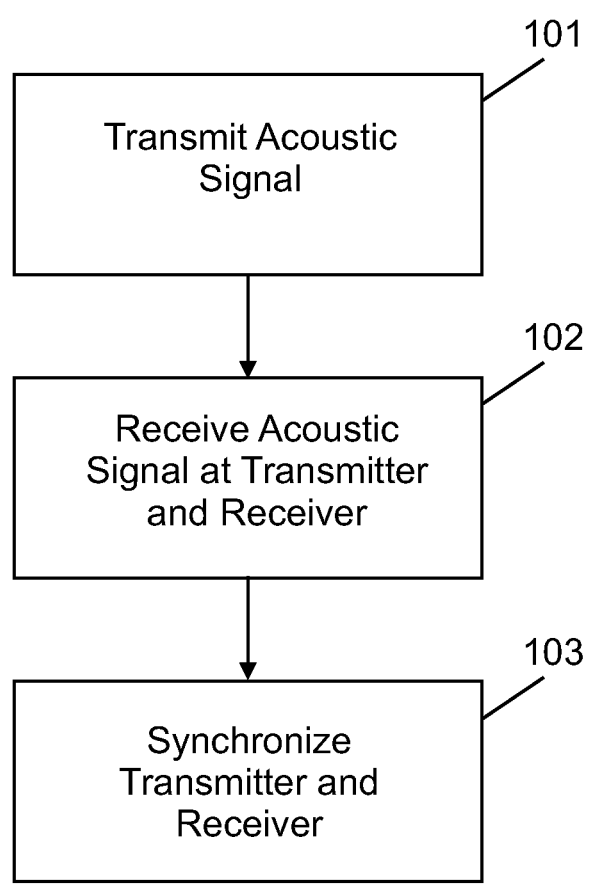
FIG. 5 is a flowchart describing a method of synchronizing signals according to one embodiment.

FIG. 5 illustrates a flowchart of a method of synchronizing an EM transmitter 11 and EM receiver 12 according to an embodiment of the invention. In operation 101, an acoustic transmitter 13 transmits an acoustic signal. The acoustic transmitter 13 may transmit the acoustic signal at predetermined time intervals or based upon commands from an external controller, such as a user, or a quality control computer program, for example. The acoustic transmitter 13 may transmit the acoustic signal through the drill pipe 10, through the drilling mud 4, and/or through the formation 2.

In operation 102, one or more acoustic sensors 14 receive the acoustic signal. The acoustic sensors 14 are electrically connected to an EM transmitter 11 and EM receiver 12. In operation 103, the received acoustic signal is used to synchronize the EM transmitter 11 and the EM receiver 12.

For example, in one embodiment, the acoustic signal generates a synchronization signal that directly controls a timing and/or duration of a transmitted EM signal and the operation of a receiving EM antenna 28 without adjusting the clocks that control the timing of the EM transmitter 11 and EM receiver 12. In an alternative embodiment, the acoustic signal generates a synchronization signal that adjusts timing, duration, and/or phase of clocks 23 and 27 that control the timing of the EM transmitter 11 and EM receiver 12.

According to the above-described embodiments, acoustic signals may be used to synchronize formation data collecting transmitters and receivers in a drill pipe where design considerations make it unfeasible to provide a synchronization via a wire between the transmitters and receivers. The acoustic signals may be generated by an acoustic transmitter and may be received by acoustic sensors. The acoustic transmitter and sensors may generate synchronization signals to synchronize the formation data collecting transmitters and receiver.

In some embodiments, the acoustic synchronization system and method are calibrated and the synchronization data and signals are corrected to account for the travel time of the acoustic signal. To perform calibration, the borehole assembly is assembled on the surface, the acoustic transmitter and acoustic receiver are powered, one or more acoustic signals are transmitted from the acoustic transmitter to the acoustic receiver, and the travel time of the acoustic signal is measured.

Next, the borehole assembly is inserted into a borehole, the acoustic signal is again transmitted, and the travel time of the acoustic signal is calculated. The travel time may be adjusted for environmental characteristics in the borehole, such as temperature. The transmission time is calculated based on the arrival time of the acoustic signal at the acoustic sensor, where the transmission time is the arrival time minus the travel duration of the acoustic signal.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for synchronizing instruments in a drill pipe to detect formation characteristics, comprising:
   at least one first transmitter in the drill pipe for transmitting a first signal;
   at least one first receiver in the drill pipe for receiving a second signal having information based on the first signal;
   at least one acoustic transmitter in the drill pipe for transmitting an acoustic signal; and
   at least one acoustic sensor in the drill pipe and electrically connected to one of the at least one first transmitter and the at least one first receiver, the at least one acoustic sensor for sensing the acoustic signal for synchronizing the at least one first transmitter and the at least one first receiver, wherein the drill pipe includes a plurality of sub-sections (subs), the at least one first transmitter is located in a different sub than the at least one first receiver, the at least one first receiver includes a plurality of first receivers, and the at least one acoustic sensor includes a plurality of acoustic sensors, each acoustic sensor electrically connected to a separate one of the plurality of first receivers, each separate one of the plurality of first receivers located in different subs.

2. The system of claim 1, wherein the at least one first transmitter includes a first clock,
   the at least one first receiver includes a second clock, and
   the acoustic signal synchronizes the first clock to the second clock.

3. The system of claim 1, wherein the at least one first transmitter includes a transmission antenna,
   the at least one first receiver includes a receiving antenna, and
   the acoustic signal synchronizes at least one of a phase and a duration of operation of the transmission antenna and the receiving antenna.

4. The system of claim 1, wherein the at least one first transmitter is an electromagnetic transmitter, and
   the at least one first receiver is an electromagnetic receiver.

5. The system of claim 1, wherein the acoustic transmitter transmits the acoustic signal through drilling mud.

6. The system of claim 1, further comprising a drilling pipe,
   wherein each of the at least one first transmitter, the at least one first receiver, the at least one acoustic transmitter, and the at least one acoustic sensor is located within the drilling pipe, and
   the acoustic transmitter transmits the acoustic signal through the drilling pipe.

7. The system of claim 1, further comprising an analysis unit configured to receive formation data from the at least one first receiver and to determine formation characteristics based on the formation data.

8. The system of claim 7, wherein the analysis unit is further configured to receive synchronization data from the at least one first receiver based on the acoustic signal received by the at least one acoustic sensor, and to determine directional formation characteristics based on the synchronization data.

9. The system of claim 1, wherein the at least one acoustic transmitter is configured to transmit the acoustic signal at the beginning of every tenth transmitter signal period.

10. A method for synchronizing instruments in a drill pipe including instruments for detecting formation characteristics, comprising
    transmitting an acoustic signal from an acoustic transmitter in the drill pipe;
    receiving the acoustic signal at an acoustic sensor in the drill pipe; and
    synchronizing a plurality of first transmitters and a plurality of first receivers based on the acoustic signal, wherein the acoustic sensor includes a plurality of acoustic sensors, each one of the plurality of acoustic sensors electrically connected to a respective one of the plurality of first receivers, and receiving the acoustic signal includes receiving the acoustic signal at each one of the plurality of acoustic sensors.

11. The method of claim 10, wherein at least one of the first transmitter and the plurality of first receivers is electrically connected to the acoustic sensor.

12. The method of claim 10, further comprising:
    transmitting an electromagnetic (EM) signal with the first transmitter; and
    receiving with the plurality of first receivers a signal including formation information based on the EM signal.

13. The method of claim 10, further comprising:
    obtaining directional information of a drill pipe in which the first transmitter and the plurality of first receivers are located; and
    generating formation data based on synchronized formation data from the plurality of first receivers and the directional information.

14. A drill pipe assembly, comprising:
    a first receiver configured to receive a signal from a formation surrounding a drill pipe of the drill pipe assembly, the signal including formation information; and a first acoustic sensor configured to sense an acoustic signal and to adjust a characteristic of the first receiver based on the received acoustic signal, wherein the first receiver includes a clock to generate a timing signal, and the first acoustic sensor generates a synchronization signal to adjust at least one of a phase and a frequency of the clock.

15. The drill pipe assembly of claim 14, wherein the first receiver includes an antenna to receive the signal, and the first acoustic sensor generates a synchronization signal to adjust an operation of the antenna.

16. The drill pipe assembly of claim 14, wherein the first acoustic sensor is configured to sense the acoustic signal from a direction within the drill pipe assembly.

17. A drill pipe assembly, comprising:
a first receiver configured to receive a signal from a formation surrounding a drill pipe of the drill pipe assembly, the signal including formation information; and
a first acoustic sensor configured to sense an acoustic signal and to adjust a characteristic of the first receiver based on the received acoustic signal, wherein the first receiver includes an antenna to receive the signal, and the first acoustic sensor generates a synchronization signal to adjust an operation of the antenna.

* * * * *